Patented July 7, 1931

1,813,174

UNITED STATES PATENT OFFICE

ARTHUR B. LAMB, OF CAMBRIDGE, MASSACHUSETTS

PROCESS OF MAKING ACTIVATED SORBENT MATERIAL

No Drawing. Application filed September 22, 1925, Serial No. 57,945. Renewed December 22, 1928.

This invention relates to sorbents for gaseous materials such as gases, vapors or mists.

Among the objects of this invention is to provide sorbents having high selective degrees or sorptive power for specific gaseous substances. A further object of this invention is to provide a process for producing sorbents of this character. A still further object of this invention is to provide a process for easily and cleanly separating gaseous substances by differential, selective sorption, and to accomplish the separation in a more efficient manner than heretofore practiced.

Heretofore, in the processes of removing vapors and gases from other gases, certain materials which have been found to possess high adsorptive power have been employed. Examples of these materials are activated carbon or charcoal, slicia gel and metallic oxides, gel-like materials such as iron oxide, aluminum oxide, etc. These highly adsorptive materials as heretofore and at present produced, are amorphous in nature. In preparing these materials, conditions tending to produce an amorphous substance are favored while those conditions tending to convert any of these substances to a crystalline structure are avoided as far as possible.

These amorphous adsorbents, in general, adsorb the less volatile gases and vapors more copiously than they do the more volatile ones, so that it has become accepted as a general law governing adsorption that the most easily liquefiable substances are the more readily adsorbed at any given temperature.

It is also true that the porosity of these amorphous adsorbents is far from uniform; that is, their pores are in part relatively coarse, in part moderately fine and in part very fine. There is, therefore, in general a considerable number of pores large enough to admit molecules of most gaseous substances, even when these molecules are relatively large, and consequently slightly volatile gases and vapors are, in general, largely adsorbed irrespective of the diameters of their molecules.

A few crystalline substances containing water have been found to retain their original crystal form wholly or in part when dehydrated, and the dehydrated materials have been found to adsorb certain gases and vapors to a moderate extent. It has been concluded that the same parallelism between ease of adsorption and ease of liquefaction which governs the adsorption by amorphous substances also obtains here.

I have discovered, by subjecting gaseous substances to the action of sorbents having pores which are substantially uniform in size or whose sizes range within relatively narrow limits, that in contradistinction to the above and to the conclusions of previous investigators of these substances certain gaseous substances of slight volatility are scarcely sorbed at all while other gaseous substances of low critical temperature and high volatility are greatly sorbed. I attribute this phenomenon of marked differences in sorptive power toward these various gases in part to the differences in size of the molecules of the gas or vapor being sorbed. No matter how strongly the vapor might normally be sorbed, if its molecule is too large or too bulky it can not make its way into the very fine pores and channels of the substantially uniformly porous materials which I use.

In preparing my new sorbents, I employ certain materials, preferably of a crystalline character, such as the natural hydrous silicates, with varying quantities of calcium and aluminum, with or without other metals. Examples of these materials are Natrolite, Chabazite, Heulandite, Gmelenite, Analcime, Microsommite, Scarmatone and Desmin. These substances are preferably heated to drive off the water which they normally contain. In treating these substances, they are heated very carefully and for a long time in a high vacuum. By this treatment sorbents are formed which possess pores of sizes lying within relatively narrow limits and often products having remarkably uniform porosity are obtained. I have found that these porous substances possess greater sorptive power toward certain gaseous substances than do the amorphous sorbents, for example activated charcoal, while toward other gaseous substances which are highly adsorbed by the amorphous sorbents, the porous products obtained by my process exhibit little or negligible adsorptive properties. For example, Chabazite, carefully dehydrated according to my process, will sorb oxygen, nitrogen, argon, neon, etc., very remarkably at the temperature of liquid air and can be used to purify helium, for instance, from these impurities much more satisfactorily than has previously been possible with amorphous sorbents, such as activated charcoal, etc.

As further illustrating the greatly different selectivity of adsorption between my new sorbents and the older types of sorbents, the behavior of these sorbents toward the saturated aliphatic hydrocarbons is a good example. With activated carbon and similar amorphous sorbents, the specific sorption of ethane, propane, butane and pentane at a given temperature gradually increases with increase in their critical temperature; that is, with decreasing volatility. The change, however, is a gradual one and there is but little marked difference, for instance, between ethane and propane, propane and butane or butane and pentane, etc. With my new sorbents, however, the difference is not only quite marked between butane and pentane, for instance, but is in the reverse direction to that obtained with the amorphous sorbents heretofore employed. I have found, for instance, that propane, in spite of its greater volatility, is adsorbed nearly four times as much at 100° C., as is butane. This remarkable exhibit of differential adsorption of gaseous substances may in part be attributed to the fact that the pores in these new sorbents will more readily accommodate the molecules of propane than those of butane.

As further illustrating the specificity of the highly dehydrated sorbents, I have found that a still more pronounced specificity can be secured by a partial dehydration. Thus, fully dehydrated Chabasite at 0° C. will adsorb about ten times as much oxygen as hydrogen at the same pressure. If, however, a sample of Chabasite dehydrated to 12% water content is tested, one finds that it will adsorb 5 cc. of oxygen per gram at 0° C. and 180 cm. pressure, while it apparently does not adsorb any hydrogen. It is possible, therefore, to obtain a very sharp separation of the two gases by utilizing a partially dehydrated adsorbent of this kind.

By new method of activating sorbent materials high grade sorbents may be produced which are useful in the separation of isomeric compounds from a mixture of these substances as well as the separation of the members of the homologous series of hydrocarbons illustrated herein. By the proper choice of the sorbent and method of activation, this differential separation can be accomplished more completely and more sharply defined than by any of the methods involving adsorption and absorption heretofore employed. Also, by proper selection of the materials from which the sorbent is to be made and the proper regulation of the activating steps of the process, sorbents with pores of various sizes may be prepared, although the range of sizes of the pores in such sorbent will be within relatively narrow limits.

A specific example of preparing my new sorbent material is as follows: Chabazite is first heated gradually to about 300° C. for several hours at a pressure less than 0.1 mm. of mercury. In this way about 18% water of the 21.5–22.3% of water normally present in the Chabazite is removed, which is approximately 90% of the total water content. The temperature is then gradually raised to about 650° C. and a large part of the remaining water is removed. The resulting product apparently does not lose its crystalline form and has a very high sorptive power, which is much greater than the less completely dehydrated material.

A still more complete removal of the water can be achieved with a corresponding increase in sorptive power and with no apparent loss of crystalline structure by the following treatment. The material, after being dried at 650° C. is brought in contact with dry ammonia gas at atmospheric temperature, whereupon very large amounts of ammonia are adsorbed. This material charged with ammonia is now heated and exposed to a vacuum. A further amount of water along with much ammonia is thus removed at temperatures as low as 100° C. Continued heating and pumping drive off more ammonia until at 420° C. about 80% of the ammonia is removed. Further heating up to 630–700° C. results in the evolution of nitrogen and hydrogen derived from the decomposition of the sorbed ammonia. All but about 0.2% of the water contained in the original mineral is removed in this way and a very highly active sorbent is thus produced.

In the foregoing description and appended claims "sorption", "sorbent" and "sorbing" are used to include the phenomena of "absorption", "adsorption" or both.

The present invention is not limited to the specific details set forth in the foregoing examples which should be construed as illustrative and not by way of limitation, and in view of the numerous modifications which may be affected therein without departing from the spirit and scope of this invention, it is desired that only such limitations be imposed as are indicated in the appended claims.

I claim as my invention:

1. In a process of activating sorbent material, treating the sorbent with ammonia and then subjecting to heat and vacuum the material charged with ammonia.

2. In a process of activating sorbent material, subjecting the sorbent to prolonged heating under vacuum, cooling the sorbent, then treating the sorbent with ammonia and then subjecting to heat and vacuum the material charged with ammonia.

3. In a process of activating sorbent material, subjecting the sorbent to prolonged heating under vacuum while gradually raising the temperature to a point not exceeding 700° C., cooling the sorbent, then treating the sorbent with anhydrous ammonia gas and then subjecting the material charged with ammonia to repeated heating under vacuum.

4. In a process of producing a sorbent material from a crystalline substance, subjecting the crystalline substance to prolonged heating under vacuum and removing from said crystalline substance at least a portion of one of its constituents and forming therein a porous structure while retaining some of its original crystalline structure.

5. In a process of producing a sorbent material from a crystalline substance, subjecting the crystalline substance to prolonged heating under vacuum and removing from said crystalline substance at least a portion of one of its constituents and forming therein a porous structure while retaining some of its original crystalline structure, cooling the sorbent, then treating the porous material with ammonia and then subjecting to heat and vacuum the material charged with ammonia.

6. In a process of activating sorbent material, treating with ammonia sorbent material having at least partial crystalline structure and then subjecting to heat and vacuum the material charged with ammonia.

7. In a process of forming an activated sorbent from a crystalline substance, subjecting the crystalline substance to prolonged heating under vacuum, cooling the resulting material and then treating with ammonia and then subjecting to heat and vacuum the material charged with ammonia.

8. In a process of producing a sorbent material from a crystalline substance, subjecting the crystalline substance to prolonged heating under vacuum while gradually raising the temperature to a point not exceeding 700° C. and removing from said crystalline substance at least a portion of one of its constituents and forming therein a porous structure while retaining some of its original crystalline structure.

9. In a process of producing a sorbent material from a crystalline substance, subjecting the crystalline substance to prolonged heating under vacuum and removing water from said crystalline substance and forming therein a porous structure while retaining some of its original crystalline structure.

In testimony whereof I affix my signature.

ARTHUR B. LAMB.